United States Patent
Gidcumb, Jr.

(10) Patent No.: US 7,597,371 B2
(45) Date of Patent: Oct. 6, 2009

(54) LEAD-IN FOR TRIM ASSEMBLY

(75) Inventor: Daniel B. Gidcumb, Jr., Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 96 days.

(21) Appl. No.: 11/742,952

(22) Filed: May 1, 2007

(65) Prior Publication Data

US 2008/0272611 A1    Nov. 6, 2008

(51) Int. Cl.
B60J 9/00    (2006.01)
(52) U.S. Cl. .................................................. 296/1.08
(58) Field of Classification Search ............... 296/1.08, 296/146.7, 187.05, 24.34, 37.8, 153, 146.1, 296/70
See application file for complete search history.

(56) References Cited

U.S. PATENT DOCUMENTS

| | | | | |
|---|---|---|---|---|
| 2,196,417 A | * | 4/1940 | Kelsen | 24/295 |
| 3,359,030 A | * | 12/1967 | Newman | 296/135 |
| 3,388,523 A | * | 6/1968 | Evans | 296/152 |
| 3,440,129 A | | 4/1969 | Anselm | |
| 3,681,180 A | * | 8/1972 | Kent | 293/128 |
| 3,687,794 A | * | 8/1972 | Shanok et al. | 428/31 |
| 3,811,989 A | * | 5/1974 | Hearn | 428/122 |
| 4,090,906 A | * | 5/1978 | Zoller | 296/41 |
| 4,220,365 A | * | 9/1980 | Foster et al. | 293/128 |
| 4,259,812 A | * | 4/1981 | Adell | 49/462 |
| 4,268,079 A | * | 5/1981 | Nomura et al. | 293/120 |
| 4,292,354 A | | 9/1981 | Katoh | |
| 4,316,348 A | * | 2/1982 | Adell | 49/462 |
| 4,318,764 A | * | 3/1982 | VanManen | 156/244.11 |
| 4,325,574 A | * | 4/1982 | Umemoto et al. | 293/120 |
| 4,429,013 A | | 1/1984 | Adell | |
| 4,478,897 A | * | 10/1984 | Akashi et al. | 428/31 |
| 4,952,358 A | * | 8/1990 | Okina et al. | 264/134 |
| 4,963,403 A | | 10/1990 | Roberts et al. | |
| 5,170,603 A | * | 12/1992 | Bartlett | 52/282.3 |
| 5,171,499 A | * | 12/1992 | Cehelnik et al. | 264/151 |
| 5,224,299 A | * | 7/1993 | Abe | 296/39.1 |
| 5,292,465 A | * | 3/1994 | Kobayashi et al. | 264/45.5 |
| 5,324,384 A | * | 6/1994 | Spengler | 156/581 |
| 5,368,903 A | * | 11/1994 | Trier | 293/128 |
| 5,385,703 A | * | 1/1995 | Shanok et al. | 264/145 |
| 5,453,309 A | * | 9/1995 | Shanok et al. | 428/31 |

(Continued)

FOREIGN PATENT DOCUMENTS

JP    06156159 A    6/1994

*Primary Examiner*—Kiran B. Patel
(74) *Attorney, Agent, or Firm*—Gifford, Krass, Sprinkle, Anderson & Citkowski, P.C.

(57) ABSTRACT

Disclosed is a trim panel with a lead-in portion for providing smooth installation into an instrument panel. The trim panel has a body with a sheet material of predetermined thickness wrapped at least partially around, and a tab extending outwardly from the body and received by an instrument panel. The tab has an outer surface and an inner surface forming a v-shape, with the outer surface having a step portion that can receive the sheet material. The step portion has a predetermined depth equal to or greater than the predetermined thickness of the sheet material. The trim panel can also include an attachment device which operates to fixedly attach the trim panel to the instrument panel.

10 Claims, 3 Drawing Sheets

U.S. PATENT DOCUMENTS

| | | | |
|---|---|---|---|
| 5,695,865 A * | 12/1997 | Shimizu | 296/146.7 |
| 5,804,118 A * | 9/1998 | Yada et al. | 264/167 |
| 5,836,641 A * | 11/1998 | Sugamoto et al. | 296/187.05 |
| 5,941,590 A | 8/1999 | Reynolds et al. | |
| 5,968,614 A | 10/1999 | Reichenberger et al. | |
| 5,979,931 A * | 11/1999 | Totani et al. | 280/728.3 |
| 6,004,498 A * | 12/1999 | Fujii et al. | 264/255 |
| 6,093,272 A * | 7/2000 | Visconti et al. | 156/219 |
| 6,095,593 A | 8/2000 | Johann et al. | |
| 6,267,436 B1 * | 7/2001 | Takahara | 296/187.05 |
| 6,322,115 B1 * | 11/2001 | Devilliers | 293/142 |
| 6,409,256 B1 | 6/2002 | Page | |
| 6,412,852 B1 * | 7/2002 | Koa et al. | 296/146.7 |
| 6,883,847 B2 | 4/2005 | Willett | |
| 6,945,583 B1 * | 9/2005 | Cowelchuk et al. | 296/1.08 |
| 6,948,753 B2 | 9/2005 | Yoshida et al. | |
| 2002/0092598 A1 * | 7/2002 | Jones et al. | 156/82 |
| 2005/0248176 A1 | 11/2005 | Ory | |

* cited by examiner

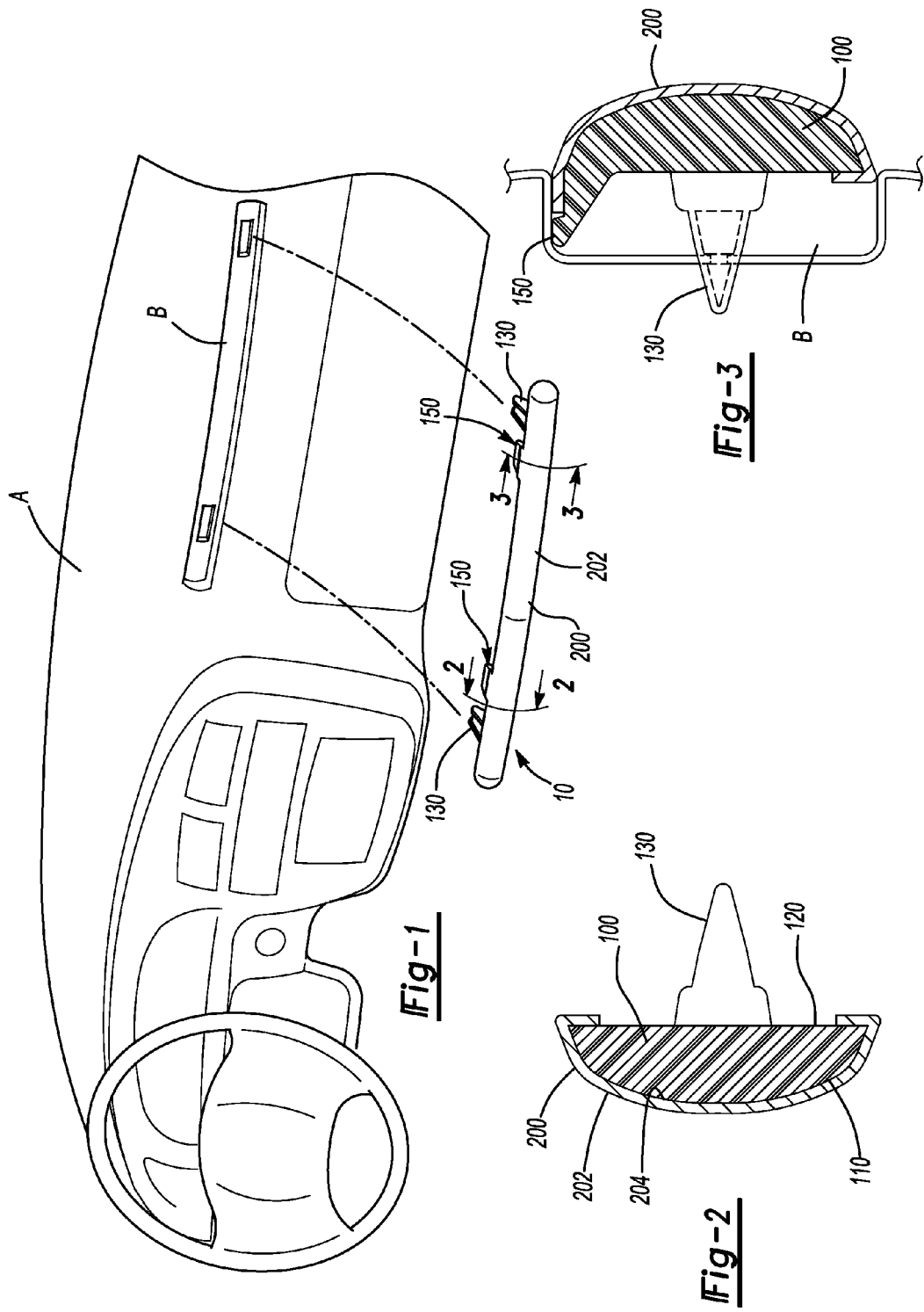

LEAD-IN FOR TRIM ASSEMBLY

FIELD OF THE INVENTION

This invention relates generally to a trim panel for a motor vehicle. More specifically, the invention relates to a lead-in tab for a trim panel in a motor vehicle.

BACKGROUND OF THE INVENTION

Trim panels are used in occupant compartments of motor vehicles. For example, an instrument panel located in the front of the passenger/driver compartment can include a variety of component openings for various components, illustratively including openings for a steering wheel, radio, instrument dials, glove compartment box, trim panel and the like. A trim slot is such an opening within the instrument panel which will accept a piece of decorative trim panel, also known as a garnish.

The attachment of a trim panel to the instrument panel must satisfy a variety of demands. These demands can include operably locating the trim panel within the trim slot, as well as ease of installment. In addition, installment of the trim panel within the trim slot should not result in scratching, denting and/or damaging the instrument panel. However, due to the mass production of motor vehicles, installation of trim panels is performed at a relatively fast pace. As such, sharp edges present on the trim panel can and/or do come into contact with soft material covering the instrument panel and subsequently cause damage. Furthermore, it is not uncommon for a trim panel to be manufactured from more than one component with sharp edges present. In particular, it is common for motor vehicle component manufacturers to wrap a sheet material around the trim panel for aesthetic purposes with the sheet material having exposed sharp edges. When such a sharp edge comes into contact with a softer material, for example the material that covers an instrument panel, scratching can occur. Therefore, there is a need for a trim panel that minimizes or eliminates damage from sharp edges during the assembly process.

SUMMARY OF THE INVENTION

Disclosed is a trim panel with a lead-in portion for providing smooth installation into an instrument panel. The trim panel has a body with a sheet material of predetermined thickness wrapped at least partially around the body, and a tab extending outwardly from the body and received by an instrument panel. The tab has an outer surface and an inner surface forming a v-shape, with the outer surface having a step portion that can receive the sheet material. The step portion has a predetermined depth equal to or greater than the predetermined thickness of the sheet material. The step portion of the tab with the sheet material received therein affords smooth sliding of the trim panel into an instrument panel when the trim panel is installed.

The trim panel can also include an attachment device which operates to fixedly attach the trim panel to the instrument panel. The attachment device can be an adhesive, a snap-fit clip, a hook-and-loop clip, a hook-and-loop fastener, a bolt, a screw, and combinations thereof.

BRIEF DESCRIPTION OF THE DRAWINGS

FIG. 1 is a perspective view of a motor vehicle instrument panel and a trim panel;

FIG. 2 is a cross-sectional side view of section 2-2 shown in FIG. 1;

FIG. 3 is a cross-sectional side view of section 3-3 shown in FIG. 1;

DETAILED DESCRIPTION OF THE PREFERRED EMBODIMENTS

Figure 4:
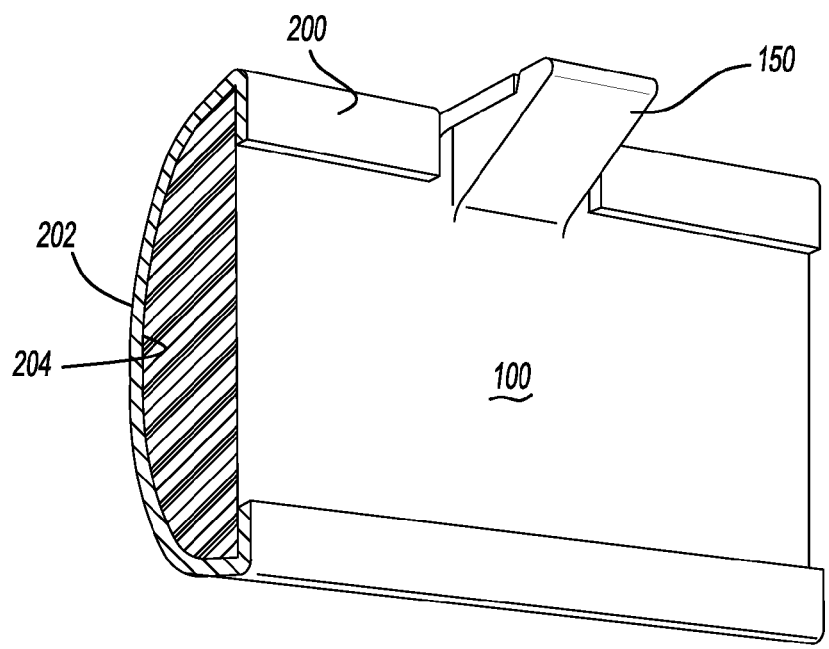
FIG. 4 is a perspective view of the trim panel.

The present invention comprises a trim panel, also known as a garnish, that provides for the smooth sliding of the trim panel into a garnish accepting panel when the trim panel is installed. As such, the present invention has utility for increasing productivity of motor vehicle assembly and decreasing damage to the garnish accepting panel during said assembly.

The trim panel of the present invention has a lead-in tab with a step region that affords for the nesting of a sheet material wrapped around a trim panel body and prevents a sharp edge of the sheet material from contacting the garnish accepting panel in a manner that causes scratching. The step region has a predetermined depth that is equivalent or greater than a predetermined thickness of the sheet material. With the step depth being of the same dimension or greater dimension that the sheet material thickness, the sharp edge of the sheet material does not come in contact with the instrument panel when the trim panel is installed.

Referring now to FIG. 1, a perspective view of an instrument panel and trim panel is shown. The instrument panel shown at A includes a trim panel slot B. The trim panel shown generally at 10 is assembled onto the instrument panel A by placing the trim panel 10 into the trim panel slot B. In order to ensure that the trim panel 10 remains attached to the instrument panel A, the trim panel 10 includes an attachment device 130, as shown in FIGS. 2 and 3.

Section 2-2 shown in FIG. 1 is provided in FIG. 2 wherein the trim panel 10 has a trim panel body 100. The trim panel body 100 has a front side 110 and a back side 120. Wrapped around the front side 110 and at least partially around the back side 120 is a sheet material 200. The sheet material 200 has an outer surface 202 and an inner surface 204 oppositely disposed from the outer surface 202, with the outer surface 202 and inner surface 204 defining a predetermine thickness 203 therebetween as shown in FIG. 6.

FIG. 3 illustrates a side cross-sectional view of section 3-3 shown in FIG. 1. This view provides a cross-sectional view of a lead-in tab 150 and illustrates the trim panel 10 after assembly and attachment to the instrument panel A.

Figure 5:
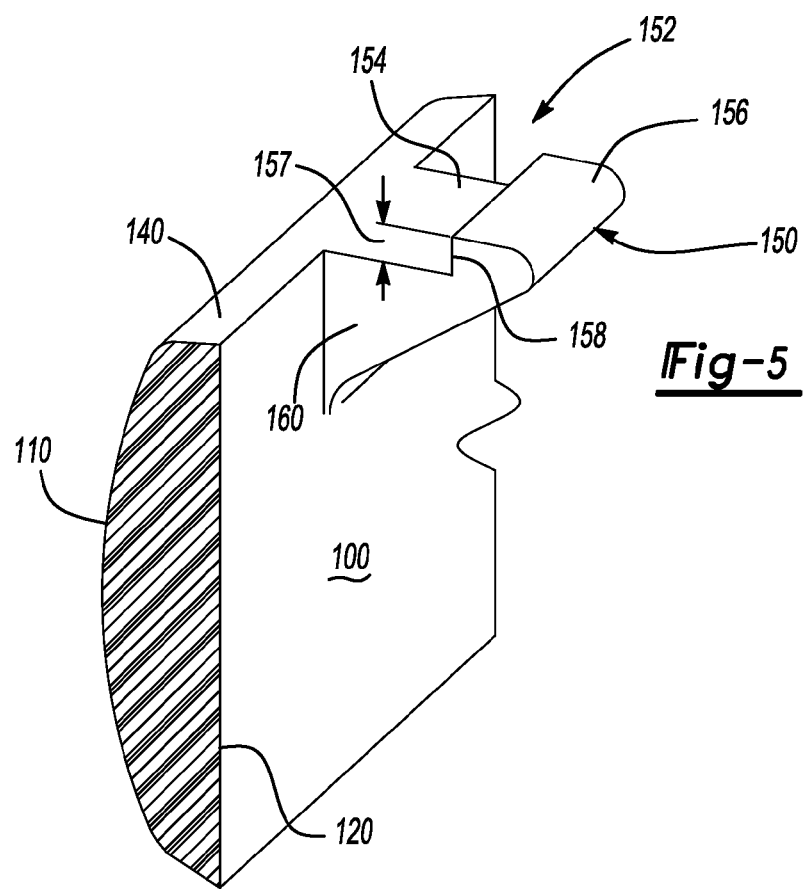
FIG. 5 is a perspective view of the trim panel without a sheet material wrapped around.

Turning to FIGS. 4 and 5, a rear perspective view of the trim panel 100 with the sheet material 200 is shown. The lead-in tab 150 extends outwardly from the trim panel 100, has a support base 160 and an outer surface and an inner surface that define a v-shape. In addition, the outer surface has a step region 152 with a predetermined depth which affords for receiving sheet material 200, as shown in FIGS. 5 and 6. The step region 152 includes a lower step surface 154 and an upper step surface 156. Between the lower step surface 154 and upper step surface 156 is an adjoining surface 158 which has a predetermined depth 157. A combination of the lower step surface 154, upper step surface 156 and adjoining surface 158 affords for a recessed region that the sheet material 200 can nest.

Figure 6:
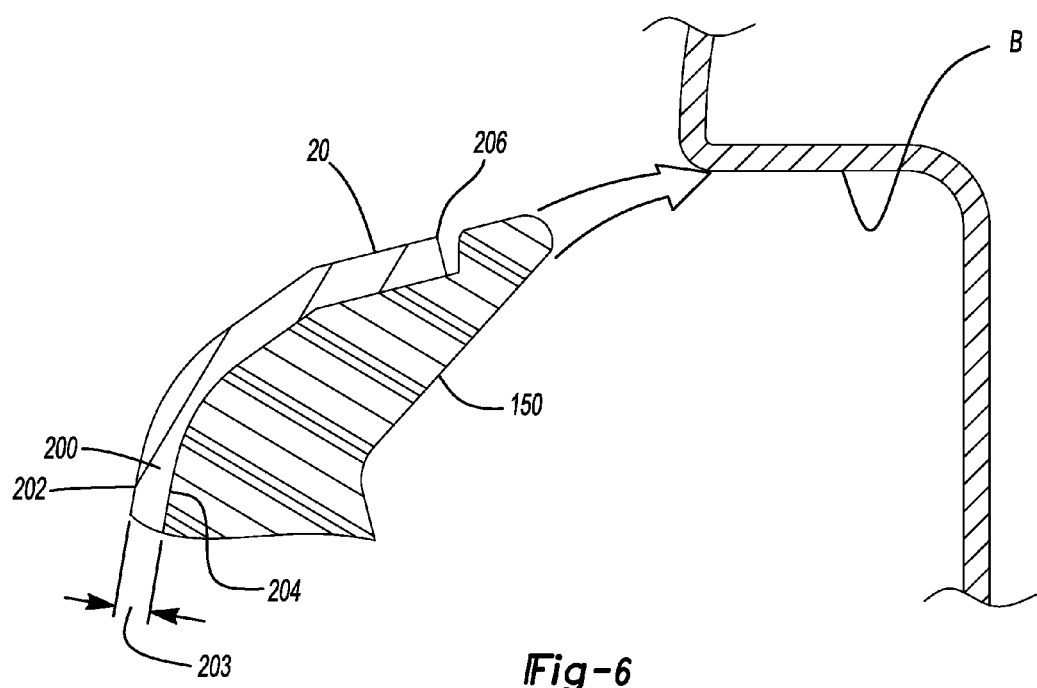
FIG. 6 is a cross-sectional side view illustrating the operation of a lead-in tab of the present invention.

Operation of the tab 150 is illustrated in FIG. 6. The upper step surface 156 and the outer surface 202 of sheet material 200 define a plane. The plane affords for the assembly of the trim panel into trim slot B without an edge 206 of the sheet material damaging the instrument panel as illustrated in FIGS. 3 and 6. In this manner, the trim panel 100 can be efficiently installed without scratching the instrument panel A.

The trim panel can be manufactured from any material known to those skilled in the art, illustratively including fiber filled acrylonitrile butadiene styrene (ABS). Preferably, the sheet material used to wrap around the trim panel body 100 is aluminum. In the alternative, the sheet material can include other metals, alloys, and/or plastics. The shape of the lead-in tab 150 is not critical so long as the sheet material edge 206 can be located adjacent to the step region 152 such that the upper step surface 156 and outer surface 202 of the sheet material 200 form a plane that affords the smooth sliding of the trim panel 10 into trim slot B.

Preferably, the step depth and sheet material thickness are equal within +/−20%. More preferably the step depth and sheet material thickness are equal within +/−10%, and even more preferably within +/−5%. The edge 206 is preferably located within four times the thickness of the sheet material from the adjoining surface 158. More preferably the edge 206 is located within three times the thickness of the sheet material from the adjoining surface 158. And even more preferably the edge 206 is located within two times the thickness of the sheet material from the adjoining surface 158.

For example, and for illustrative purposes only, an aluminum sheet having a thickness of 0.56 mm can be wrapped around the trim panel 100 as illustrated in the figures. The adjoining surface 158 has a height dimension of 0.56 mm. In the alternative, the adjoining surface 158 has a height dimension of greater than 0.56 mm. The edge can come within 1 mm from the second surface 156 with a tolerance of +/−0.2 mm. In this manner, the lead-in surface 20 affords the edge 206 of the sheet material 200 to not damage, scratch, etc., the instrument panel A when the trim panel 10 is assembled into the trim panel slot B.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. A trim panel for sliding smoothly into an instrument panel comprising:
   a body having a tab extending outwardly therefrom, said tab having a step region with a predetermined depth;
   a sheet material having an outer surface and an inner surface with a predetermined thickness therebetween, said sheet material covering a portion of said body and nested into said step region;
   wherein said predetermined thickness of said sheet material is equal to said predetermined depth of said step region within +/−20%.

2. The trim panel of claim 1, wherein said sheet material and said step portion of said tab define a plane, said plane operable for the trim panel to smoothly slide into the instrument panel.

3. The trim panel of claim 1, wherein said sheet material is aluminum.

4. The trim panel of claim 1, further comprising an attachment device, said device operable to fixedly attach said trim panel to the instrument panel.

5. The trim panel of claim 4, wherein said attachment device is selected from the group consisting of an adhesive, a snap-fit clip, and hook-and-loop clip, a hook-and-loop fastener, a bolt, a screw and combinations thereof.

6. The trim panel of claim 1, wherein said tab is operable to position said body at least partially within the instrument panel.

7. The trim panel of claim 1, wherein said predetermined depth of said step portion is greater than said predetermined thickness of said sheet material.

8. The trim panel of claim 1, wherein said tab has a width, said tab width equal to a width of said sheet material received in said step portion.

9. The trim panel of claim 8, wherein said tab width is greater than said width of said sheet material received in said step portion.

10. The trim panel of claim 1, wherein said step region has a lower step surface, an upper step surface and an adjoining surface extending between said lower step surface and said upper step surface.

* * * * *